United States Patent
Castelli Dezza et al.

(10) Patent No.: US 8,680,702 B2
(45) Date of Patent: Mar. 25, 2014

(54) CONTROL SYSTEM FOR WIND FARMS WITH AEROGENERATIONS PROVIDED WITH MODULAR CONVERTERS

(75) Inventors: Francesco Castelli Dezza, Cesena (IT); Gabriele Marchegiani, Cesena (IT); Fabio Pallotti, Cesena (IT); Gabriele Rosati, Cesena (IT)

(73) Assignee: Trevi Energy SpA, Cesena (FC) (IT)

( * ) Notice: Subject to any disclaimer, the term of this patent is extended or adjusted under 35 U.S.C. 154(b) by 28 days.

(21) Appl. No.: 13/505,956

(22) PCT Filed: Sep. 30, 2010

(86) PCT No.: PCT/IB2010/002500
§ 371 (c)(1),
(2), (4) Date: May 3, 2012

(87) PCT Pub. No.: WO2011/055175
PCT Pub. Date: May 12, 2011

(65) Prior Publication Data
US 2012/0217749 A1    Aug. 30, 2012

(30) Foreign Application Priority Data

Nov. 3, 2009   (IT) ................ TO2009A0841

(51) Int. Cl.
*H02P 9/04*    (2006.01)
(52) U.S. Cl.
USPC ............................................. 290/44
(58) Field of Classification Search
USPC ................. 290/44, 55; 700/286–290
See application file for complete search history.

(56) References Cited

U.S. PATENT DOCUMENTS

| | | | | |
|---|---|---|---|---|
| 5,083,039 A * | 1/1992 | Richardson et al. | ............ | 290/44 |
| 5,225,712 A * | 7/1993 | Erdman | ............ | 290/44 |
| 6,680,856 B2 * | 1/2004 | Schreiber | ............ | 363/71 |
| 7,126,236 B2 * | 10/2006 | Harbourt et al. | ............ | 290/44 |
| 7,324,359 B2 | 1/2008 | Schreiber | | |
| 7,345,373 B2 * | 3/2008 | Delmerico et al. | ............ | 290/44 |

(Continued)

FOREIGN PATENT DOCUMENTS

| | | |
|---|---|---|
| EP | 1 553 689 | 7/2005 |
| EP | 1 876 696 | 1/2008 |

(Continued)

OTHER PUBLICATIONS

International Search Report for International Application No. PCT/IB2010/002500 mailed Feb. 3, 2011.

*Primary Examiner* — Tulsidas C Patel
*Assistant Examiner* — Viet Nguyen
(74) *Attorney, Agent, or Firm* — Merchant & Gould P.C.

(57) ABSTRACT

A control system (50, 100) is for wind power plants including aerogenerators (10) provided with DC modular converters (40). The control system (50, 100) includes devices for receiving at least a voltage signal coming from a DC medium voltage line (MTDC) electrically connected to the converters (40) and a mechanical torque signal ($C_{RIF}$) produced by the aerogenerators (10) and controls AC-DC conversion modules (40a'-40a'''') of the plant. The modules have electronic devices driven by impressed voltage and producing on their outputs a respective partial continuous voltage ($Vdc_i$). For each aerogenerator (10) there are secondary control stages (100) and a single main control stage (50). Each of the secondary control stages (100) supplies control signals to a respective AC-DC conversion module (40a'-40a'''') and is designed to keep the partial continuous voltage ($Vdc_i$) at a constant value.

14 Claims, 6 Drawing Sheets

(56) References Cited

U.S. PATENT DOCUMENTS

| | | | |
|---|---|---|---|
| 7,492,058 B2* | 2/2009 | Chen | 307/64 |
| 7,511,385 B2* | 3/2009 | Jones et al. | 290/43 |
| 7,638,983 B2* | 12/2009 | Park et al. | 322/20 |
| 7,680,562 B2* | 3/2010 | Delmerico et al. | 700/297 |
| 7,745,949 B2* | 6/2010 | Yang et al. | 290/44 |
| 7,755,209 B2* | 7/2010 | Jones et al. | 290/44 |
| 7,939,970 B1* | 5/2011 | Walling et al. | 307/84 |
| 7,944,068 B2* | 5/2011 | Wagoner et al. | 290/44 |
| 7,952,232 B2* | 5/2011 | Burra et al. | 307/64 |
| 8,097,970 B2* | 1/2012 | Hyvarinen | 290/44 |
| 8,097,971 B2* | 1/2012 | Ichinose et al. | 290/44 |
| 8,129,853 B2* | 3/2012 | Abolhassani et al. | 290/44 |
| 8,138,620 B2* | 3/2012 | Wagoner et al. | 290/44 |
| 8,174,138 B2* | 5/2012 | Castelli Dezza et al. | 290/44 |
| 8,188,610 B2* | 5/2012 | Scholte-Wassink | 290/44 |
| 8,253,393 B2* | 8/2012 | Bo et al. | 322/44 |
| 8,269,363 B2* | 9/2012 | Arinaga | 290/44 |
| 8,299,642 B2* | 10/2012 | Ichinose et al. | 290/44 |
| 8,466,573 B2* | 6/2013 | Kikuchi et al. | 290/44 |
| 2007/0073445 A1* | 3/2007 | Llorente Gonzalez et al. | 700/286 |
| 2008/0007973 A1 | 1/2008 | Schreiber | |
| 2008/0198637 A1* | 8/2008 | Meysenc et al. | 363/67 |
| 2009/0322083 A1* | 12/2009 | Wagoner et al. | 290/44 |
| 2010/0109328 A1* | 5/2010 | Li et al. | 290/44 |
| 2011/0018270 A1* | 1/2011 | Corcelles Pereira et al. | 290/44 |
| 2011/0057444 A1* | 3/2011 | Dai et al. | 290/44 |
| 2011/0198847 A1* | 8/2011 | Hopewell | 290/44 |
| 2011/0266800 A1* | 11/2011 | Inzunza Figueroa et al. | 290/44 |
| 2012/0022714 A1* | 1/2012 | Sng | 700/298 |
| 2012/0025535 A1* | 2/2012 | Sihler et al. | 290/55 |

FOREIGN PATENT DOCUMENTS

| | | |
|---|---|---|
| EP | 2 114 001 | 11/2009 |
| IT | TO20 080 324 | 11/2009 |
| WO | WO 2007/054729 | 5/2007 |
| WO | WO 2010049027 A1 * | 5/2010 |

* cited by examiner

PRIOR ART

*Fig.1*

PRIOR ART

CONTROL SYSTEM FOR WIND FARMS WITH AEROGENERATIONS PROVIDED WITH MODULAR CONVERTERS

This application is a National Stage Application of PCT/IB2010/002500, filed 30 Sep. 2010, which claims benefit of Serial No. TO2009A000841, filed 3 Nov. 2009 in Italy and which applications are incorporated herein by reference. To the extent appropriate, a claim of priority is made to each of the above disclosed applications.

BACKGROUND

The present invention refers to the field of controls for electrical machines and in particular refers to a control system for wind power plants with aerogenerators provided with DC modular converters.

Figure 1:
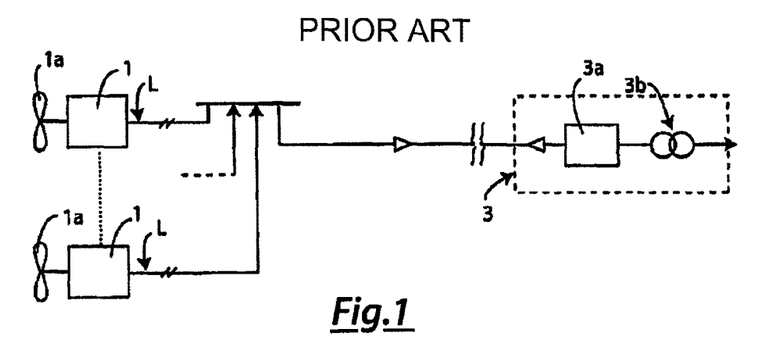
FIG. 1 shows a block diagram of a wind power plant of the known kind.

As schematically shown in FIG. 1, it is known that the wind plants use a plurality of aerogenerators 1, each one equipped with a respective wind impeller, 1a, which is supplied with the wind kinetic energy and can be mechanically controlled in such a way as to:
vary its alignment with respect to the wind direction;
vary the incidence of the blades which form impeller 1a, in such a way as to adjust the wind power converted into mechanical power.

Inside the wind power plant, each aerogenerator is parallel connected to other aerogenerators 1 through a medium-voltage distribution electric network comprising a plurality of bipolar-type and DC electric lines L. The electric power produced by aerogenerators 1 and conveyed through the DC and medium-voltage distribution network, is transmitted through one or more medium or high voltage DC electric lines. Downstream with respect to these electric lines, there is a conversion station 3, which connects the wind power plant to the national transmission electric network.

Inside conversion station 3 there are at least an inverter 3a having an input supplied by DC line L and a respective output supplying the inlet of one or more step-up transformers 3b connected between the output of inverter 3a and the electric network.

Inside aerogenerator 1 there are, in order to create the drive train or power conversion chain (technically known as drivetrain), an electric generator 1b having a plurality of stator independent three-phase electric circuits (or three-phase voltage stars) 2 each of which is connected, through a respective three-phase line 2a, to a static conversion stage of electric power 4 of modular type and multi-leveled, from alternating voltage (present on stars 2) to direct voltage. Between electric generator 1b and wind impeller 1a it is not interposed any step-up gear (gear box), in such a way as to reduce as much as possible the weight of the nacelle of aerogenerator 1 and to increase the energetic efficiency and the reliability of the whole system.

Figure 2:
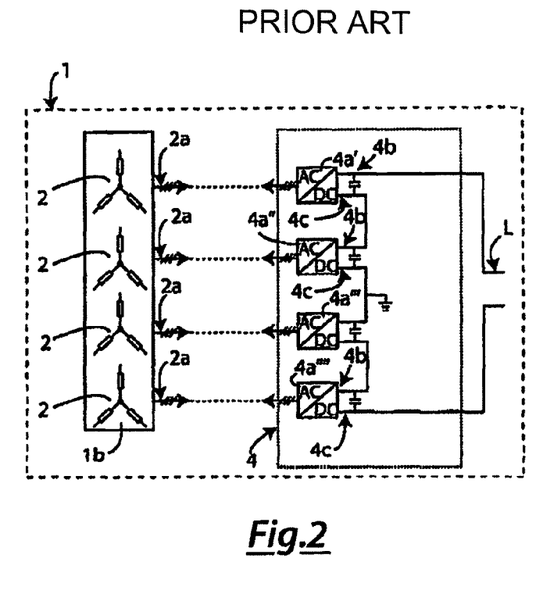
FIG. 2 shows a detail of part of the power plant of FIG. 1.

More in detail, as shown in FIG. 2, the stage of conversion 4 from alternating current (voltage) (AC) to direct current (voltage) (DC), comprises in its inner a plurality of AC-DC conversion modules 4a'-4a'''' each of which has a respective input connected to a respective three-phase line 2a and a respective pair of output terminals 4b 4c between which it is connected a respective condenser bank. The AC-DC conversion modules 4a'-4a'''' are of impressed voltage type formed by forced switching activated (IGB, IGCT or MCS) electronic devices and by respective recirculation diodes antiparallel connected to them, in such a way as to create a three-phase bridge.

Each AC-DC conversion module 4a'-4a'''' is connected in series to the remaining AC-DC conversion modules, such that each of terminals 4b of each AC-DC conversion module 4a is directly connected to terminal 4c of the adjacent converter.

Each of the two AC-DC conversion modules, 4a'; 4a'''', at the edge of the series present a respective terminal 4b and respectively 4c connected at the output to conversion stage 4, in such a way as to form the medium voltage and DC bipolar line L.

Figure 3:
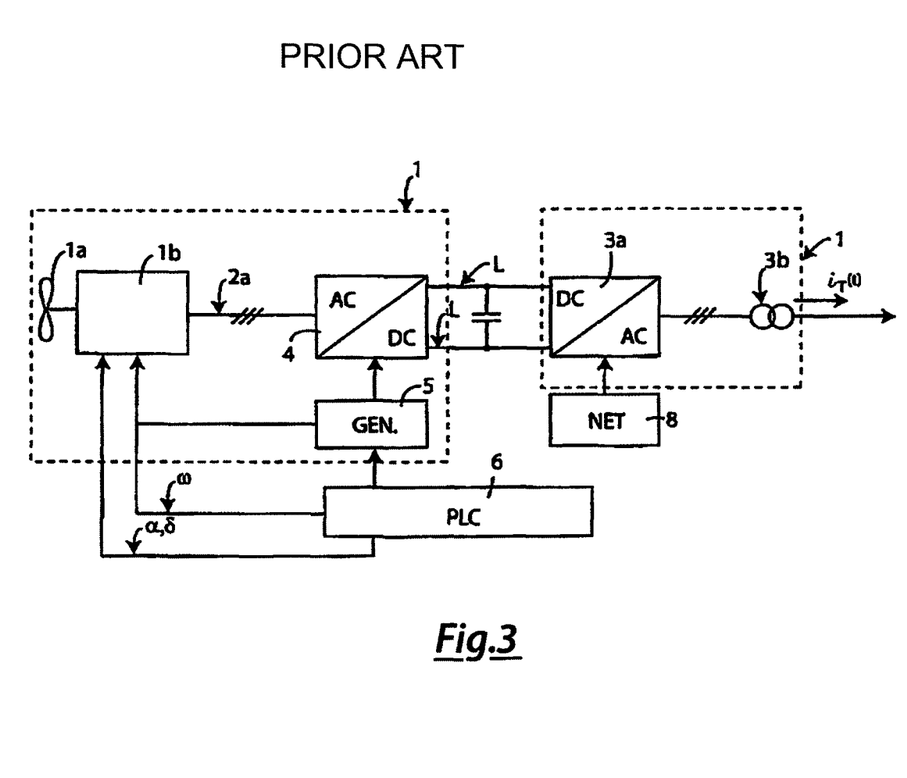
FIG. 3 shows a block diagram of part of a control system for wind power plants of the known kind.

The structure proposed for the control system for the wind power plant shown in FIG. 1, equipped with aerogenerators with drivetrain as in FIG. 2, bases itself on the control system used nowadays in the direct-driven aerogenerators with AC/DC/AC static converter of full scale type (i.e. at full power) shown in FIG. 3, which represents the state of the art for the last generations of wind turbines. In this, control structure a PLC 6 (programmable logic controller) operates as general controller of the wind turbine (Wind Turbine Controller) receiving as input a plurality of signals related to states, alarms and measures coming from the various subsystems (not shown) that are integrated in the aerogenerator. PLC 6 manages, through its own output signals, respectively blade angle setting $\alpha$, yawing angle $\delta$ of wind impeller 1a and rotation speed $\omega$ of generator 1b, from which depend the torque and therefore the power converted to the shaft by the generator. Furthermore PLC 6 provides the power and torque references to:
a first control stage 5 of the converter, which controls generator 1b through conversion stage 4; and
a second control stage 8 of the converter, installed in conversion station 3, which drives inverter 3a interfaced with the electric network. As shown in detail in FIG. 3, each converting stage 4 presents a respective first control stage 5, called "master" (i.e. principal) receiving as input a first signal $V_{DC}$, related to the voltage present on the line L and a second signal $C_{RIF}$ of mechanical torque generated by electric generator 1b; these signals come from PLC controller 6. The purpose of the first control stage 5 is to adjust the impulses of the gate terminal of the IGBT or IGCT transistors provided inside AC-DC conversion modules 4a'-4a''''.

PLC controller 6 also sends a further control signal to a second control stage 8, which drives the operation of inverter 3a.

Inverter 3a has, as a matter of fact, an own control stage 8, capable of monitoring and keeping constant the above said voltage present on line L.

The control structure described in FIG. 3, used nowadays for each of aerogenerators 1, is present on each aerogenerator of the wind power plant.

Supposing that, as illustrated in FIG. 1, each AC-DC conversion module 4a produces on its output terminals 4b, 4c a direct voltage equal to 6 kV, and that AC-DC conversion modules 4a'-4a'''' placed in series are exactly four as shown in FIG. 2, it is clear that on line L is provided a direct voltage of 24 kV, thus in medium voltage, directed toward conversion station 3.

The group of aerogenerators 1, conversion station 3, electric lines L, PCL 6 and of the first, second conversion control stage 5, 8, form the so called MVDC system (medium voltage and direct current).

However, if a wind power plant is managed with these control systems, without bringing any modifications, there would be some drawbacks. In detail, if the voltage on line L is controlled and kept constant by the second control stage 8 of inverter 3a, it is not possible to precisely verify how it is distributed on each single AC-DC conversion module 4a. For example, supposing as before that each AC-DC conversion module $4a'$-$4a''''$ has to nominally produced 6 kV DC, in such a way as to obtain on line L a 24 kV direct voltage or, owing to imbalances or lack of balance among the stars or among the conversion modules, the voltage on outputs $4b$, $4c$ of each of the AC-DC conversion modules $4a'$-$4a''''$ can assume values even very different (in a purely exemplificative way with the four modules that produce respectively 6 kV, 4 kV, 8 kV e 6 kV) without the total sum of the voltage produced by them having to change.

Since stars 2 to which the AC-DC conversion modules $4a'$-$4a''''$ are connected are not perfectly identical as for the characteristics, the voltage lack of balance between a converter and the other is effectively provided with a certain frequency and, if provided in elevated values, can cause the breaking of AC-DC conversion module $4a'$-$4a''''$ (for example of its IGBT or IGCT) owing to a too elevated voltage.

The use of a medium voltage and DC distribution network for the interconnection of aerogenerators, introduces another difficulty related to the protection system of the network, due in particular to the lacking of DC switches, adapted to beari voltage and power in such a way as to be used in a DC multi-terminal network as the one of FIG. 1.

As a matter of fact, in common DC electric networks, in case of failure, it is possible to carry out a quick sectioning of the section concerned by the failure without having the need of using particular constructive solutions in the AC switches positioned as protection for the electric lines; this is due to the fact that the alternating current, for each period, presents two instants wherein it has null value (supposing a sinusoidal current signal, these instants occur for an angle corresponding to 0 or 180°), in which the instantaneous value of current (zero, exactly) thus makes easier the opening of the switch and thus the sectioning of the circuit.

Vice versa, using a DC multi-terminal electric network, the lacking of passages through the zero of the medium voltage here present and thus of the current which passes on lines L, does not enable an efficient sectioning in case of failure, because the DC technology switches nowadays present on the market, would not succeed in effectively extinguishing the electric arc that would result in case of opening of the device in failure condition; therefore, they cannot be used.

In case of short-circuit then, at the moment the possible solution is to use the three-phase switches on the AC side of converters 4a and to coordinate their use with an opportune orientation of the blades of impeller 1a of the aerogenerators, in such a way as to slow down the wind impeller up to the total stop of the turbine. However, this shut-down procedure in case of failure on the DC network, has the disadvantage of being particularly long and thus of not enabling for a "shut-down" of the power plant in a reasonable time to avoid other aggravations of the failure already experienced and to keep the integrity of the modular converter and of the multi-pole generator safe.

SUMMARY

A purpose of the present invention is to realize a control system for wind plants with aerogenerators provided with DC modular converters which is free from the above described incovenients.

According to the present invention a control system for wind plants with aerogenerators provided with DC modular converters.

According to the present invention a control system for wind plants with aerogenerators provided with DC modular converters is realized as claimed in claim 1.

BRIEF DESCRIPTION OF THE DRAWINGS

The invention will be now described with reference to the attached drawings, which illustrate a non-limiting embodiment, wherein.

DETAILED DESCRIPTION

Figure 4:
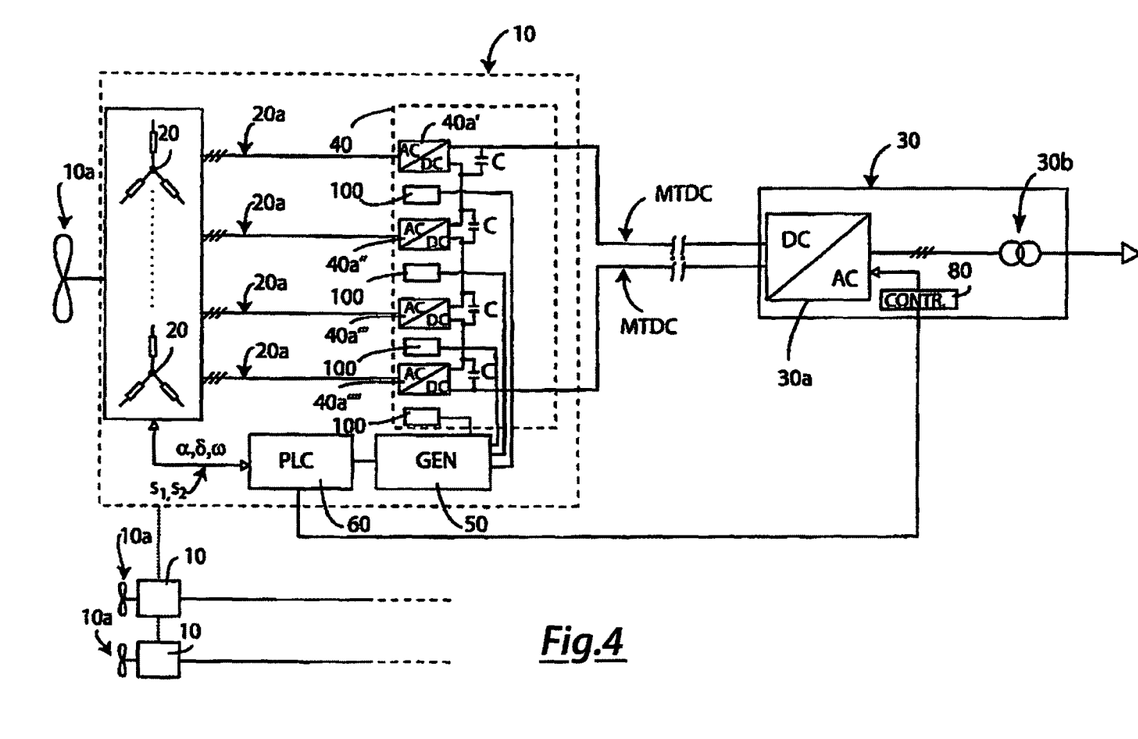
FIG. 4 shows a block diagram of a wind power plant using a control system according to the present invention.

With reference to FIG. 4, a control system for wind plants with direct coupling aerogenerators ("direct drive", i.e. without multiplier, i.e. gear box, in order to reduce the weight of the aerogenerator nacelle) provided with modular converters with medium voltage and DC output is generally indicated with 5, 100.

The control system according to the present invention is adapted to control and protect an aerogenerator 10 of a wind plant, which comprises a plurality of aerogenerators 10 installed either on the ground or offshore, each of which possesses at least an electric generator 10b directly connected to a wind impeller 10a, made up of one or more blades, which can be controlled in a first incidence value δ (yawing angle of the impeller with respect to the wind direction) and in a second value α (pitch setting angle of the blades on the hub of the impeller) in such a way as to vary the incidence of the wind on the impeller and, thus, the rotation speed ω of electric generator 10b and thus the mechanical power converted to the shaft by wind impeller 10a.

Each aerogenerator 10 is connected, inside the wind power plant, in parallel to other aerogenerators 10, at the output of which is provided an electric line which realizes a DC MTDC network (Multi Terminal Direct Current) at medium voltage (from 15 kV to 60 kV), upon which it is conveyed the electric power produced by the wind plant and directed to a conversion station 30 installed on the ground both in case of a wind plant in the sea (off-shore) and on the ground (on-shore).

Inside conversion station 30 are provided:

at least an inverter 30a from direct current (DC) to alternating current (AC) having an input connected to the MTDC line; and a voltage step-up transformer 30b (from 20÷80 kV to 150 kV or more) connected at its input to one of the outputs of inverter 30a and having an output directed toward the electric network of transmission of the power directed toward the using consumers.

Inside aerogenerator 10 are present an electric generator 10b having a plurality N of independent voltage three-phase circuits 20, indicated as stars, each of which is connected, through a respective three-phase line in wire 20a, with a stage of power static conversion 40 from alternating voltage (which comes rightly from stars 20) to direct voltage. Between electric generator 10b and wind impeller 10a it is not interposed any gear box or multiplier, in such a way as to reduce as much as possible the weight of the nacelle of aerogenerator 10 and, at the same time, to increase its energetic efficiency. For this reason, aerogenerator 10 is of the so called "direct drive" type.

More in detail, as illustrated in FIG. 4, the stage of power static conversion 40 comprises in its inner part a plurality of AC-DC conversion modules 40a'-40a'''' each of which has a respective input connected to a respective three-phase line 20a and a respective pair of output terminals 40b 40c.

Figure 5:
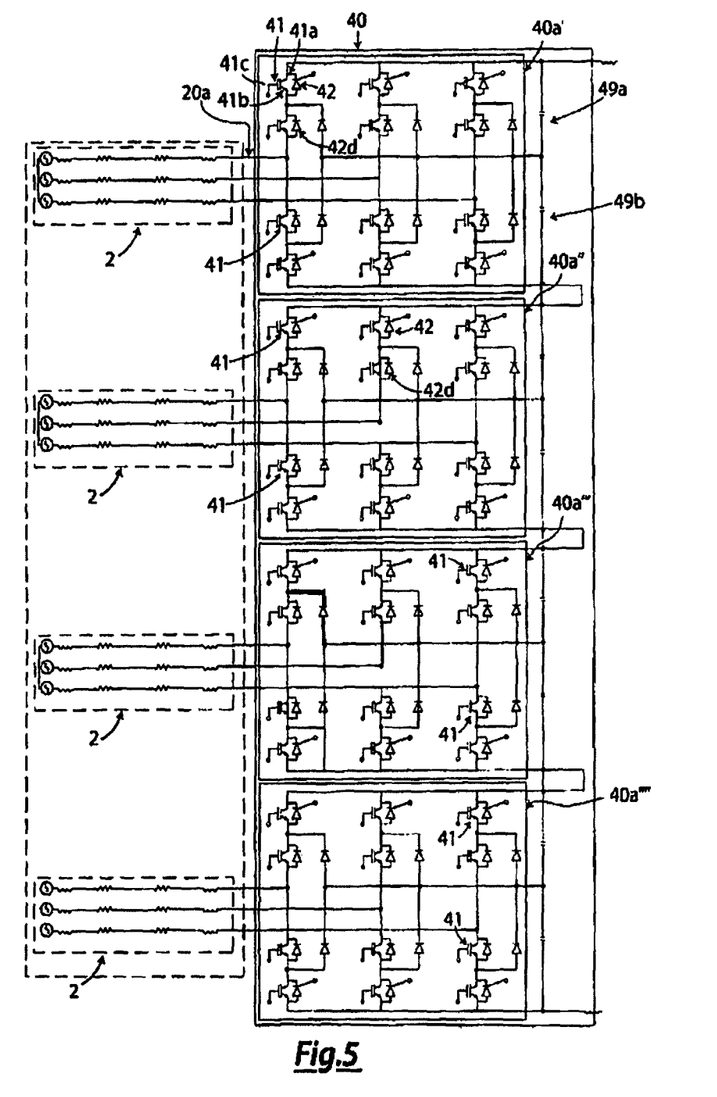
FIG. 5 shows a more detailed diagram of a plurality of conversion modules of the control system object of the present invention.

As better detailed in FIG. 5, the AC-DC conversion modules 40a'-40a'''' are of three-phase inverter type, driven by impressed voltage, comprising at least a plurality of electronic devices driven by forced switching (IGBT, IGCT or MCS) and of respective recirculation thyristors antiparallel connected to the above said electronic devices driven by forced switching, in such a way as to create a three-phase bridge.

In particular, FIG. 2 illustrates a solution wherein are present IGBT transistors and, therefore, wherein inside AC-DC conversion modules 40a'-40a'''' is present a static converter module (MCS) comprising a plurality of IGBT insulated gate bipolar transistors 41, each of which is provided with a collector terminal 41a, an emitter terminal 41b and a gate terminal 41c.

The AC-DC conversion modules 40a'-40a'''' comprise an IGBT positive branch 49a and an IGBT negative branch 49b; for the positive branch 49a, are present, for each phase of the three-phase line 20a of each star, a pair of IGBT transistors in series having a node in common between the collector terminal 41a of the IGBT transistor 41 having emitter terminal 41b connected to three-phase line 20a and emitter terminal 41b of IGBT transistor 41 having collector terminal 41a connected to the output of conversion module 40a'; for negative branch 49b, are present, for each phase of three-phase line 20a of each star, a pair of IGBT transistors in series having a node in common between collector terminal 41a of IGBT transistor 41 having emitter terminal 41b connected to the output of conversion module 40a' and emitter terminal 41b of IGBT transistor 41 having collector terminal 41a connected to three-phase line 20a.

In positive branch 49a, the IGBT transistors having the collector terminal connected to the output of the conversion module provide a recirculation thyristor 42, having an anode connected to emitter terminal 41b and a cathode connected to collector terminal 41a of respective IGBT transistor 41, whereas in the other IGBT transistor 41 it is provided a recirculation diode 42d.

Vice versa, in negative branch 49b the IGBT transistors having emitter terminal 41b connected to the output of the conversion module provide a recirculation thyristor 42, having an anode connected to emitter terminal 41b and a cathode connected to collector terminal 41a of respective IGBT transistor 41, whereas in the other IGBT transistor 41 it is provided a recirculation diode 42d.

Being the three-phase line 20a comprising obviously three conductors, it exist sfor each branch three pairs of two IGBT transistors; each pair has an emitter and a respectively collector terminal connected to a different phase of the three-phase line.

As a matter of fact, in positive branch 49a the IGBT transistors are connected to three-phase line 20a with the respective emitter terminals 41b; in negative branch 49b the IGBT transistors are connected to three-phase line 20a with the respective collector terminals 41a.

Inside the AC-DC conversion modules 40a'-40a'''' are also provided recirculation diodes 47, that in positive branch 49a are connected to a cathode terminal in the node in common between the two IGBT transistors of each pair of IGBT of positive branch 49a, and an anode terminal supplied by three-phase line 20a, whereas in negative branch 49 are connected with a cathode terminal to a three-phase line 20a and an anode terminal supplied by the node in common among the two IGBT transistors of each pair of IGBT of negative branch 49b.

FIG. 5 illustrates a four-stars solution, but it is clear that the number of stars can vary, bringing with it an obvious variation of the number of conversion modules 40a'-40a''''.

Each conversion module AC-DC 40a'-40a'''' is connected in series to the remaining AC-DC conversion modules, such that, each of terminals 40b of each AC-DC conversion module 40a'-40a'''' is directly connected to terminal 40c of the adjacent converter. Among terminals 40b, 40c of each of AC-DC conversion modules 40a'-40a'''' is provided a capacitive element (condenser bank of DC bus) 40d.

Respectively, the two AC-DC conversion modules 40a', 40a'''', at the edge of the series provide a respective terminal 40b and respectively 40c output connected to the stage of power static conversion 40, in such a way as to create the bipolar MTDC line.

Figure 6:
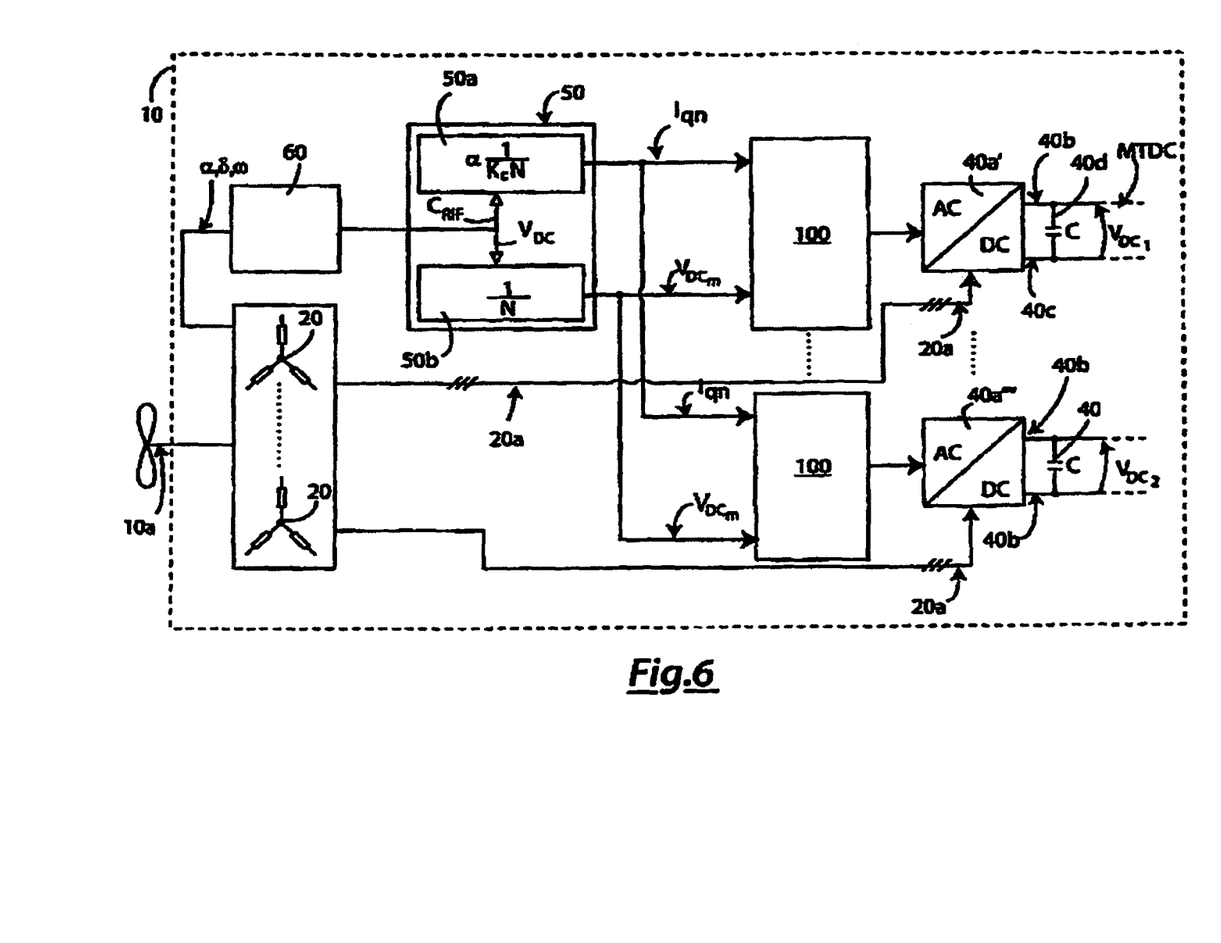
FIG. 6 shows a detail of part of the block diagram shown in FIG. 4.

As illustrated in detail in FIGS. 4 and 6 each stage of power static conversion 40 provides a respective first main (or master) control stage 50 receiving as input a first voltage signal $V_{DC}$ related to the MTDC line and a second mechanical torque signal $C_{RIF}$ related to the torque impressed to the shaft by the wind impeller 10a and to be generated, in form of equilibrating electromagnetic torque, by electric generator 10b; these signals come from a PLC controller 60, which possesses a plurality of outputs upon which are provided a plurality of signals s1, s2 adapted to control pitch adjustment angle α of the blades and yawing angle δ of wind impeller 10a of aerogenerator 10, and consequently rotation speed ω. The purpose of the first control stage 50 is to control the secondary (or slave) control stages 100, which send the control signals of the impulses of the gate terminal of the electronic devices driven by forced switching inside AC-DC conversion modules 40a'-40a''''.

In particular, the first control stage 50 comprises in its inner:
a first processing module 50a, which provides for multiplying the second signal $C_{RIF}$, supplied upon its first logical input, by a factor proportional to 1/(Kc N), wherein Kc torque constant of electric generator 10b and N equal to the number of stars 20 which form the generator, in order to produce on one of its outputs the current reference signal Iqn, reference of vector quadrature axis current, which is send as input to secondary control stages 100; and
a second processing module 50b, which acts as divider, dividing the first signal $V_{DC}$ by a factor N equal to the number of stars 20 of each aerogenerator; the second module 50b thus presents an output upon which it is present the signal $V_{DCm}$, which represents the voltage value provided on the MTDC line divided by the number N of stars 20.

PLC controller 60 also sends another control signal to a second control stage 80, which drives the operation of inverter 30a positioned on the conversion station 30 on-shore.

Supposing that, as illustrated in FIG. 4, each AC-DC conversion module 40a'-40a'''' produces upon its output terminals 40b 40c a direct voltage equal to 6 kV, and that AC-DC conversion modules 40a'-40a'''' positioned in series are exactly four as represented in figure, it is evident that upon the MTDC line it will be provided a 24 kV direct voltage, thus in medium voltage, directed toward conversion station 30.

Inverter 30a has its own control stage capable of monitoring and keeping constant the above said voltage povided on the MTDC line.

The first control stage 50 manages a number N of secondary control stages 100, in number equal to the number of AC-DC conversion modules 40a'-40a'''', provided inside conversion stage 40, which has the function of controlling the keeping of the constancy of the direct voltage present on output terminals 40b, 40c of respective AC-DC conversion module 40a, in order to keep it balanced with respect to the direct voltage provided on output terminals 40b, 40c of remaining AC-DC conversion modules 40a.

In other words, this means that, supposing being provided four AC-DC conversion modules 40a for each conversion stage 40, as in FIG. 4, a direct voltage of the respective first, second, third and fourth AC-DC conversion module 40a $Vdc_i$ with i=1, ... , 4, will be kept equal to a quarter of the total value of the direct output voltage $V_{dc}$ present on the MTDC line.

For this reason, by way of generalization, the purpose of secondary control stages 100 is to control the torque generated by each single star 20 of generator 10b through a vector direct axis d and quadrature axis q field orientation control and to keep the direct voltage $Vdc_i$ of the i-th AC-DC conversion module equal to:

$$V_{dc_i} = \frac{1}{N} V_{dc}$$

wherein $V_{dc}$ represents the voltage value, provided on the MTDC line.

Figure 7:
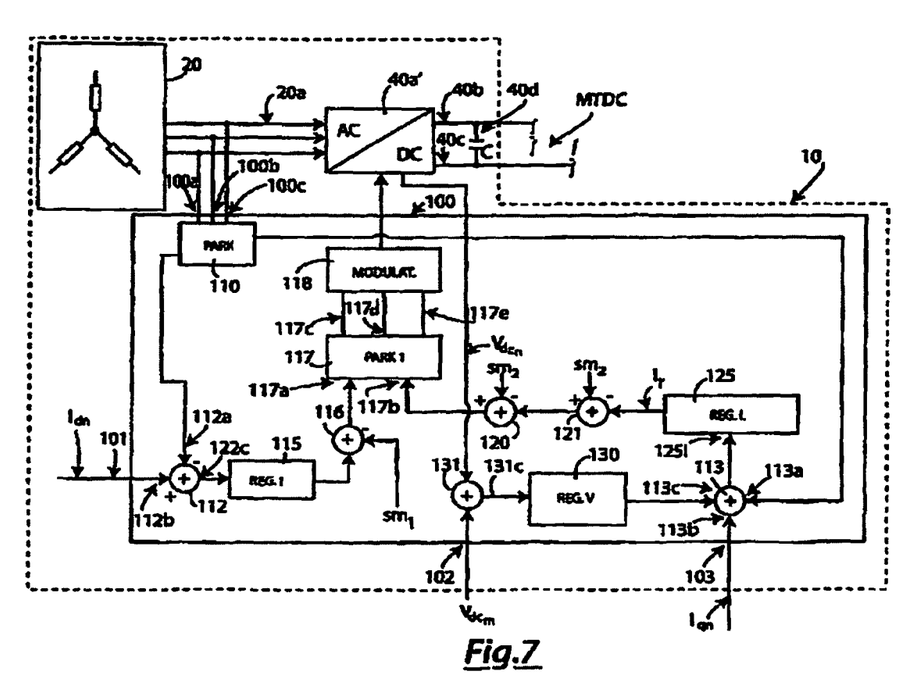
FIG. 7 shows a detail of a block diagram of the control system according to the present invention.

As illustrated in detail in FIG. 7, each of the secondary control stages 100 comprises a plurality of inputs 100a-100c, 101, 102, 103 and an output 105 which sends control signals to the gate terminals of the IGBT or IGCT driven electronic devices of provided AC-DC conversion modules 40a'-40a''''.

More in detail, the above said plurality of inputs 100a-100c, 101, 102, 103 comprises a first triad of inputs 100a-100c related to the measures of the currents passing in the three-phase line 20a which from each star 20 departs toward the respective AC-DC conversion module 40a'-40a''''. The first triad of inputs 100a-100c is connected as input to a first processing stage 110, which carries out the calculation of the Park's transformation stage on rotating axis as follows:

$$P = \frac{2}{3} \begin{bmatrix} \cos(\theta) & \cos\left(\theta - \frac{2\pi}{3}\right) & \cos\left(\theta + \frac{2\pi}{3}\right) \\ \sin(\theta) & \sin\left(\theta - \frac{2\pi}{3}\right) & \sin\left(\theta + \frac{2\pi}{3}\right) \\ \frac{1}{2} & \frac{1}{2} & \frac{1}{2} \end{bmatrix}$$

wherein θ represents the angle of a system of axis rotating at a speed ω, d (direct axis) and q (quadrature axis), integral with the rotor of electric generator 10b. By applying the Park's transformation stage upon rotating axis to the current measures 100a, 100b, 100c comes the definition of a current spatial phasor identifiable with the current components along axis d, Id, and along axis q, Iq.

Through this transformation it can therefore be controlled the torque generated by each single star 20 by means of a vector field orientation control algorithm, based on the adjustment of the components of Id and Iq currents produced by each conversion module 40a.

The first processing stage 110 comprises also a first and a second output 110a, 110b, respectively connected:

to a first input 112a of a first adder 112; and
to a first input 113a of a second adder 113.

The first and the second adder 112, 113 comprise also respective second inputs 112b, 113b, which are directly connected to the inputs 101, 103 of the secondary control stage 100.

On first input 101 it is present a reference signal for the value of the Iqn quadrature current component (technically known as set-point signal) to be produced by the AC-DC conversion module 40a, whereas on third input 103 arrives a reference signal for the value of the Idn direct axis current component, which typically, for low rotation speeds of the generator as in case of a direct-driven wind turbine, is set on a value equal to zero for not continuing the field weakening of generator 10b.

On second input 102 it is provided a voltage signal $Vdc_m$, coming from first control stage 50, which represents the value of the voltage provided on the MTDC line divided by the number of stars 20 which each generator 10b possesses and which acts as reference for voltage regulator 130.

First adder 112 provides an output 112c equal to the instantaneous error between the measure provided on input 112a of Park's transformation stage 110 (measure of the Id direct axis current) and the Idn reference 101; output 112c is directly connected to an input of a first current regulator 115, which also provides an output connected to a first input 116a of a third adder 116, which also provides a second input 116b upon which it is provided a first movement control signal sm1. The output of third adder 116 represents a Vd component of a Park spatial phasor of the voltages which must be produced by AC-DC conversion module 40a for actuating the right adjustment of the Id direct axis current component. This signal is addressed to a first input of a Park's anti-transformation stage 117, which multiplies its input signals coming from the third and fourth adder nodes 116, 120 by the following transformation matrix:

$$P^{-1} = \begin{bmatrix} \cos(\theta) & \sin(\theta) & 1 \\ \cos\left(\theta - \frac{2\pi}{3}\right) & \sin\left(\theta - \frac{2\pi}{3}\right) & 1 \\ \cos\left(\theta + \frac{2\pi}{3}\right) & \sin\left(\theta + \frac{2\pi}{3}\right) & 1 \end{bmatrix}$$

Park's anti-transformation stage 117 provides, as a matter of fact, a second input 117b, upon which it is provided the signal related to the component of quadrature axis voltage Vq of the Park spatial phasor of voltages, which must be produced by AC-DC conversion module 40a' for actuating the right adjustment of the Iq quadrature axis voltage component and of the DC bus $V_{DCi}$ on outputs 40b, 40c of single AC-DC conversion module 40a'. Park's anti-transformation stage 117 provides also a first, second and third output 117c, 117d, 117e, which are positioned as input with a modulation stage 118, which provides an output directed toward respective AC-DC conversion module 40a', and upon which are provided the control signal of opening and closing of the gate terminals of the electronic devices driven by impressed voltage provided in its inner part.

To the second input 117b of Park's anti-transformation stage 117 arrives a signal coming from a fourth and a fifth adder 120, 121 respectively connected in series, which add a second and third movement control signal sm2, sm3, not directly influent on the right operation of the control system but useful for improving the dynamic response of the current regulators, to a current adjustment signal $i_r$ coming from an output of a second current regulator 125. The second current regulator 125 provides a respective input 125$i$ connected to the output of the second adder 113; upon this input it is provided the error signal related to the q axis current component, which must be brought to zero by means of regulator 125, in order to ensure the right operation of the vector field orientation direct control system.

The secondary (or slave) control stage 100 comprises also a voltage stage regulator 130, having a respective input connected to an output 131$c$ of a sixth adder 131 and a respective output connected to a third input 113$c$ of the second adder 113. The voltage regulator stage 130 is provided with an output saturator which generates a correction signal of said quadrature current signal (Iqn). This correction signal is needed to restore the voltage imbalance on outputs 40$b$, 40$c$ (DC bus) of the respective AC-DC conversion module 40$a'$-40$a''''$ with respect to the others, so that the direct voltage provided on the MTDC line is equally divided among all the AC-DC conversion modules 40$a'$-40$a''''$.

Sixth adder 131 has a first and second input receiving respectively the reference signal of voltage $V_{dcm}$ provided on the second input 102 of secondary control stage 100 and a measurement signal of the voltage $V_{dci}$ provided on the output of the respective AC-DC controller 40$a'$-40$a''''$.

It is now described a second embodiment of the control system according to the present invention. This second embodiment differentiates from the previous one because, further than exerting a control function of the direct voltage produced by each of the AC-DC conversion modules 40$a'$-40$a''''$ of each conversion stage 40, carries out also a function of protection of the wind plant in case of failures deriving from short-circuits on the MTDC line.

This second embodiment, for correctly functioning, must provide that at least part of the AC-DC conversion modules 40$a'$-40$a''''$ present in its inner of electronic devices driven by impressed voltage (for example IGBT) whose collector and emitter terminals are connected, respectively, to a cathode and anode of a thyristor, and not to a simple recirculation diode. In this way, as it will be better described hereinafter, it is possible to limit the strong failure current which would be created on the MTDC line in case of short-circuit in the direct voltage, extinguishing it in a very short time, at the maximum equal to half of a cycle (from a minimum of 10 ms to a maximum of 35 ms) of the alternating voltage produced by generator 10$b$, without having the need of providing for the interruption of the elevated error current by means of switches with direct current technology to be installed on the line itself.

In order to do so, an over-current sensor, positioned on the MTDC line, constantly measures the value of the temporal derivative of the electric current flowing there; in normal conditions (first operating configuration) this overcurrent sensor does not act on the secondary control stages 100, and the control system works exactly as in the previously described case. Vice versa, when this value is higher than a determined threshold value Δm, sign of a failure of the aerogenerator or of a short-circuit, the overcurrent sensor enters into a second operating configuration wherein it acts on the secondary control stages 100 by supplying them with an alarm signal, which imposes to bring the impulses of the gate terminal of the IGBT or IGCT electronic devices driven by impressed voltage of the AC-DC conversion modules 40$a'$-40$a''''$ to zero, and removing the control impulse to the recirculation thyristors.

The advantages of this control system according to the present invention are clear in the light of the previous description. In particular, the control system according to the present invention permits at first to keep equilibrated the direct voltage produced by each of the AC-DC conversion modules 40$a'$-40$a''''$ with respect to the other present in the same conversion stage 40, without creating imbalances which an inverter 30$a$ would not notice (because the sum of $Vdc_i$ voltages would remain constant) but potentially able to damage if not to totally break the IGBT, IGCT, diodes or thyristors provided inside the AC-DC conversion module itself.

This permits to have a single inverter 30$a$ at a very high power (for example 10 MW or more), for a wide plurality of aerogenerators 10, and i.e. to have a single inverter at a very high power which manages, on-shore, all aerogenerators 10 potentially provided in the wind plant, without worrying—during its functioning—about how the single AC-DC conversion modules 40$a'$-40$a''''$ behave, as this control is demanded to secondary control stages 100.

Control system 50, 100 thus permits to obtain excellent performance in keeping the constancy of the voltages $V_{DCi}$ on the outputs of the AC-DC conversion modules 40$a'$-40$a''''$, after for example an insertion of condensers C of different capacity on the outputs of AC-DC conversion modules, different resistance or inductance of the wires of the line of connection among stars 20 and conversion modules 40$a'$-40$a''''$, short-circuit among the turns of one or more phases of the aerogenerator, insertion of an additive resistance on one of the wires of the MTDC line or disconnection of one of the aerogenerators themselves from the parallel inside the wind plant.

Furthermore, the system according to the present invention also permits to reduce the risk of having huge damages in case of short-circuits on the MTDC line, without the need of neither complex nor expensive systems of mechanical interruption of the current and complex systems of quick shut-down of blade 10$a$ of aerogenerators 10.

To the device up to here described, some variants, changes or additions obvious for those skilled in the art can be added without departing from the protective scope of the attached claims.

In particular, it is clear that to the recirculation diode used inside the conversion modules described in the present invention, can be used either a thyristor or a polarized static switch (IGBT or IGCT with diode in series on the emitter).

It is also clear that if IGBT transistors 41 previously described are replaced by transistors of different kind, the terminal names to which the diodes and recirculation thyristors are connected will consequently change.

The invention claimed is:

1. A control system for wind power plants, said wind plants comprising a plurality of aerogenerators;
   each of the plurality of aerogenerators being connected in parallel to other of the plurality of aerogenerators through a direct current (DC) multi-terminal direct current (MTDC) network at medium voltage comprising a plurality of bipolar and DC electric lines;
   each of the plurality of aerogenerators comprising an electric aerogenerator having a plurality of stator independent three phase electric star circuits, each of the circuits being connected with a stage power static conversion from alternating voltage to direct voltage;
   the stage power static conversion comprising a plurality of AC-DC conversion modules, each of the conversion modules having a respective input connected to a respective star circuit and a respective pair of output terminals;

each of the AC-DC conversion modules being connected in series to remaining ones of the plurality of AC-DC conversion modules so that each of the terminals of each of the AC-DC conversion modules is directly Connected to the terminal of an adjacent conversion module; two AC-DC conversion modules at an edge of the series provide a respective terminal and respective output connected to the stage power static conversion to form a medium voltage and DC bipolar line;

the control system comprises means for receiving at least a voltage signal coming from a DC medium voltage line electrically connected to said converters and a mechanical torque signal produced by said aerogenerators and controls a plurality of AC-DC conversion modules of said plant, within the conversion modules are a plurality of electronic devices driven by impressed voltage and producing a respective partial continuous voltage at outputs above said AC-DC conversion modules;

a plurality of secondary control stages and a single main control stage for each aerogenerator; each of the secondary control stages has a multiplicity equal to a number of stars of said aerogenerator, comprises a voltage regulator and supplies a control signal to a respective AC-DC conversion module and is designed to keep said partial continuous voltage at a constant value;

said voltage regulator having an input and receiving a reference voltage for a voltage to be output by a respective AC-DC conversion module and a reference current signal for current to be produced by a respective AC-DC conversion module and generating a correction signal of the reference current signal for restoring a voltage imbalance on outputs of the respective AC-DC conversion module with respect to other AC-DC conversion modules, so that the direct voltage provided on an MTDC line is equally divided among all of the AC-DC conversion modules.

2. The system according to claim 1, wherein said partial continuous voltage of each single AC-DC conversion module is equal to a fraction of the continuous voltage present on said line.

3. The system according to claim 1, said voltage regulator receiving a second voltage signal at the input of said voltage regulator, of an output continuous voltage produced by said respective AC-DC conversion module; said first and second voltage signal being algebraically summed between them by a first adder connected at the input to said voltage regulator.

4. The system according to claim 3, wherein said reference current signals comprise a first direct axis current signal and a second quadrature current signal.

5. The system according to claim 4, further comprising a first current regulation stage and/or a second current regulation stage, having a respective input supplied with at least said direct axis current signal and said quadrature current signal respectively.

6. The system according to claim 5, comprising the first adder and/or a second adder; said first adder having a first input directly supplied with said direct axis current signal and an output directly supplying said input of said first voltage regulator; said second adder having a first input directly supplied with said quadrature current signal, a second input directly supplied by said voltage regulator, and an output directly supplying an input of a second voltage regulator.

7. The system according to claim 1, further comprising a Park's transformation stage and a Park's anti-transformation stage; the Park's transformation stage having a triad of inputs supplied with an electric signal coming from an output line directly connected to a single star of said aerogenerator respectively; the Park's anti-transformation stage having a triad of outputs supplying a modulation stage of said secondary control stage; said modulation stage having an output supplying control signals to said respective AC-DC conversion module.

8. The system according to claim 7, comprising a first adder and/or a second adder, wherein said Park's transformation stage comprises a plurality of outputs supplying a second input of said first adder and a second input of said second adder respectively.

9. The system according to claim 1, further comprising an overcurrent sensor, which measures a value of the electric current on a medium voltage line supplied by said AC-DC conversion modules; said overcurrent sensor being designed to operate in a first operating condition in which there is no change to the operation of said secondary control stages and a second operating condition, in which said overcurrent sensor supplies said secondary control stages with an alarm signal for the zero setting of the electric voltage produced by said aerogenerator.

10. The system according to claim 9, wherein said measure of a value of electric current is a measure of a time derivative of said current.

11. The system according to claim 10, wherein said second operating condition switches when a threshold value of said derivative is exceeded, and wherein said alarm signal causes a null signal of voltage of gate terminals of a plurality of electronic devices driven by impressed voltage contained in each of said AC-DC conversion modules, and a signal of impulse zero setting of control terminals of a recirculation thyristor antiparallel connected to each of said electronic devices driven by impressed voltage.

12. The system according to claim 11, wherein said electronic devices driven by impressed voltage are IGBT or IGCT transistors arranged in a plurality of pairs, wherein each pair comprises two transistors in series, and wherein said recirculation thyristors comprises a first terminal and a second terminal respectively connected to terminals of said IGBT or IGCT and wherein a terminal selected between said first and second terminal of said recirculation thyristor is directly connected to an output of said AC-DC conversion module.

13. The system according to claim 12, further comprising other recirculation semiconductor devices connected to said electronic devices driven by impressed voltage selected among diodes, thyristors or polarized static switches.

14. The system according to claim 1, wherein said voltage regulator inputs receive a first voltage signal related to a single AC-DC conversion module and a plurality of reference current signals.

* * * * *